United States Patent
Sankar et al.

(10) Patent No.: US 9,910,887 B2
(45) Date of Patent: Mar. 6, 2018

(54) VARIABLE SEARCH QUERY VERTICAL ACCESS

(71) Applicant: Facebook, Inc., Menlo Park, CA (US)

(72) Inventors: Sriram Sankar, Palo Alto, CA (US); Kedar Dhamdhere, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1239 days.

(21) Appl. No.: 13/870,113

(22) Filed: Apr. 25, 2013

(65) Prior Publication Data
US 2014/0324963 A1 Oct. 30, 2014

(51) Int. Cl.
G06F 15/16 (2006.01)
G06F 17/30 (2006.01)
G06Q 50/00 (2012.01)

(52) U.S. Cl.
CPC .. G06F 17/30424 (2013.01); G06F 17/30528 (2013.01); G06F 17/30902 (2013.01); G06Q 50/01 (2013.01)

(58) Field of Classification Search
CPC ......... G06F 17/30011; G06F 17/30864; G06F 17/30958; G06F 17/30424; G06F 17/277; G06F 17/30477; G06F 17/30675; G06F 17/30336; G06F 17/30622; G06F 17/30657; G06F 17/30327; Y10S 707/99933; Y10S 707/99934; Y10S 707/99935
USPC ................ 709/201, 202, 203, 204, 205, 206
See application file for complete search history.

(56) References Cited

U.S. PATENT DOCUMENTS

| | | | |
|---|---|---|---|
| 6,470,336 B1 * | 10/2002 | Matsukawa | ....... G06F 17/30011 |
| 7,461,059 B2 | 12/2008 | Richardson | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Smit | |
| 8,239,364 B2 | 8/2012 | Wable | |
| 8,271,471 B1 | 9/2012 | Kamvar | |
| 8,271,546 B2 | 9/2012 | Gibbs | |
| 8,321,364 B1 | 11/2012 | Gharpure | |
| 8,364,709 B1 | 1/2013 | Das | |

(Continued)

OTHER PUBLICATIONS

International Search Report and Written Opinion for International Application PCT/US2014/035219, dated Aug. 25, 2014.

(Continued)

*Primary Examiner* — David R Lazaro
(74) *Attorney, Agent, or Firm* — Baker Botts L.L.P.

(57) ABSTRACT

In one embodiment, a method includes receiving from a user of an online social network a search query input comprising a character string having a number of characters; accessing one or more verticals that each store objects associated with the online social network, where if the number of characters is less than or equal to a threshold number, then accessing a first set of verticals, and if the number of characters is greater than the threshold number, then accessing the first set of verticals and a second set of verticals; searching each accessed vertical to identify one or more objects associated with the vertical that substantially match the character string; and sending to the user references to the identified objects.

18 Claims, 7 Drawing Sheets

(56) References Cited

U.S. PATENT DOCUMENTS

| | | |
|---|---|---|
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,595,297 B2 | 11/2013 | Marcucci |
| 8,601,027 B2 | 12/2013 | Behforooz |
| 2003/0101163 A1* | 5/2003 | Lui .................. G06F 17/30637 |
| 2005/0131872 A1 | 6/2005 | Calbucci |
| 2007/0019864 A1* | 1/2007 | Koyama ........... G06F 17/30247 |
| | | 382/218 |
| 2007/0277100 A1 | 11/2007 | Sheha |
| 2008/0033926 A1 | 2/2008 | Matthews |
| 2008/0065617 A1* | 3/2008 | Burke ............... G06F 17/30646 |
| 2009/0006543 A1 | 1/2009 | Smit |
| 2009/0094200 A1 | 4/2009 | Baeza-Yates |
| 2009/0228296 A1 | 9/2009 | Ismalon |
| 2009/0281988 A1 | 11/2009 | Yoo |
| 2010/0057723 A1 | 3/2010 | Rajaram |
| 2010/0179929 A1 | 7/2010 | Yin |
| 2010/0235354 A1 | 9/2010 | Gargaro |
| 2010/0306191 A1* | 12/2010 | LeBeau ............. G06F 17/30864 |
| | | 707/723 |
| 2011/0078166 A1 | 3/2011 | Oliver |
| 2011/0087534 A1 | 4/2011 | Strebinger |
| 2012/0023085 A1* | 1/2012 | Bellerive ......... G06F 17/30867 |
| | | 707/706 |
| 2012/0166433 A1 | 6/2012 | Tseng |
| 2012/0278127 A1 | 11/2012 | Kirakosyan |
| 2012/0284329 A1 | 11/2012 | van den Oord |
| 2012/0311034 A1 | 12/2012 | Goldband |
| 2012/0317097 A1* | 12/2012 | Tseng ................ G06F 17/30864 |
| | | 707/722 |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2014/0280115 A1* | 9/2014 | Collin ............... G06F 17/30522 |
| | | 707/731 |

OTHER PUBLICATIONS

Extended European Search Report for EP Application No. 14787386.3-1952, dated Oct. 27, 2016.

* cited by examiner

VARIABLE SEARCH QUERY VERTICAL ACCESS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a social-networking system may search for objects associated with the system using a search queries.

In particular embodiments, in response to a search query input received from a user, the social-networking system may accessing one or more verticals to search for objects that match the character string of the search query input. The number of verticals accessed in response to the search query input may vary based on the length of the character string. For shorter character strings, the character string may match a large number of objects. Consequently, processing a relatively short character string may be an inefficient. In order to improve the efficiency of the query process, only a limited number of verticals may be searched for matches to shorter character strings. However, as the user inputs additional characters, additional verticals may be searched. As the search query increases in length, fewer objects will match the query, and thus it may become more efficient to search a larger number of verticals for matches to the longer character string. Based on the identified objects, the social-networking system may then send references to those objects for display to the user, for example in a drop-down menu associated with the query field. The querying user may then select among the references to indicate that the object corresponding to the reference should be retrieved by the social-networking system. By accessing a variable number of verticals as described herein, the efficiency of the query process may be improved by limiting the number of verticals that are search in response to relatively short search queries that may match a large number of objects, and by expanding the number and type of verticals searches as the query becomes more refined.

DESCRIPTION OF EXAMPLE EMBODIMENTS

System Overview

Figure 1:
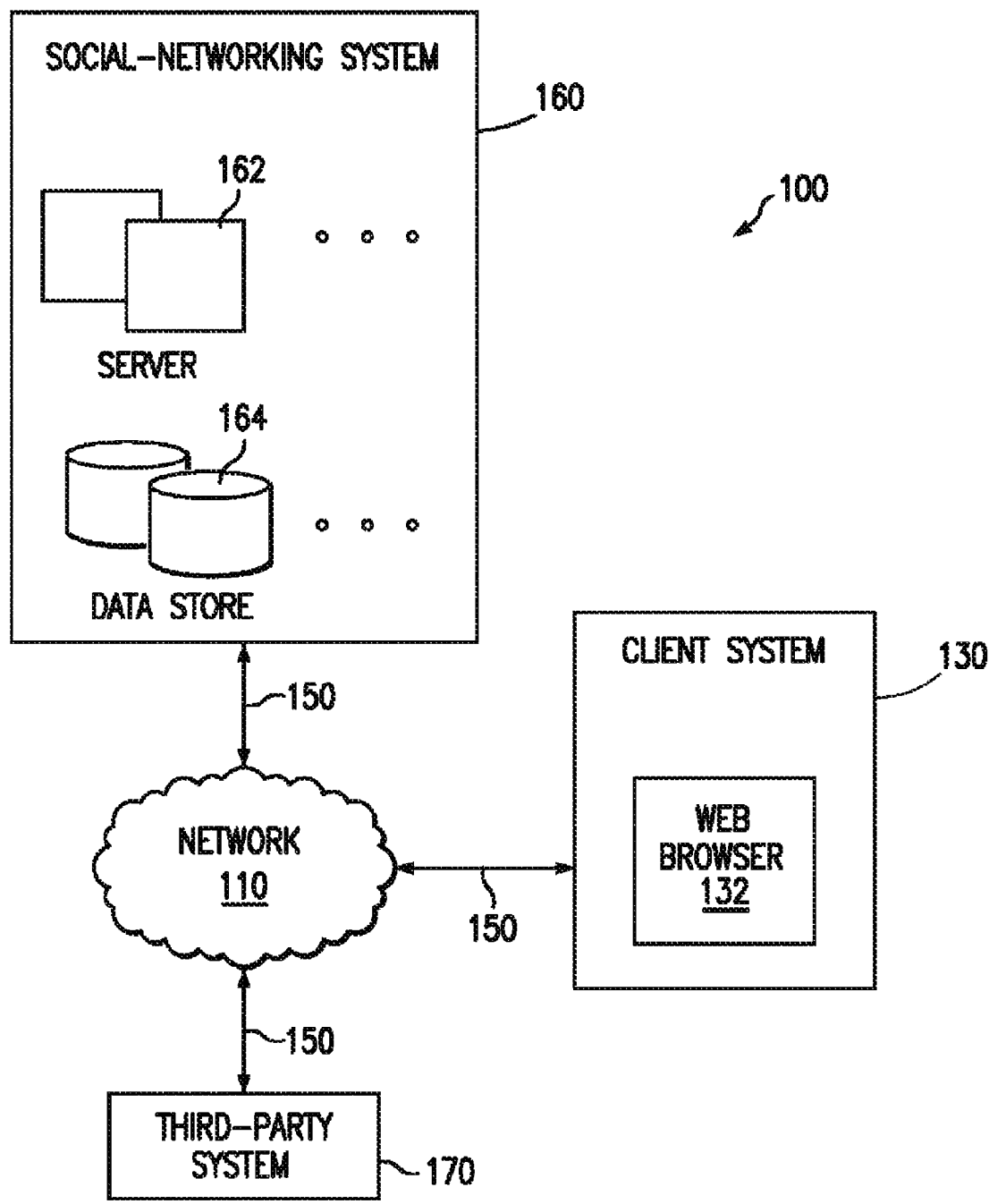
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content objects (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
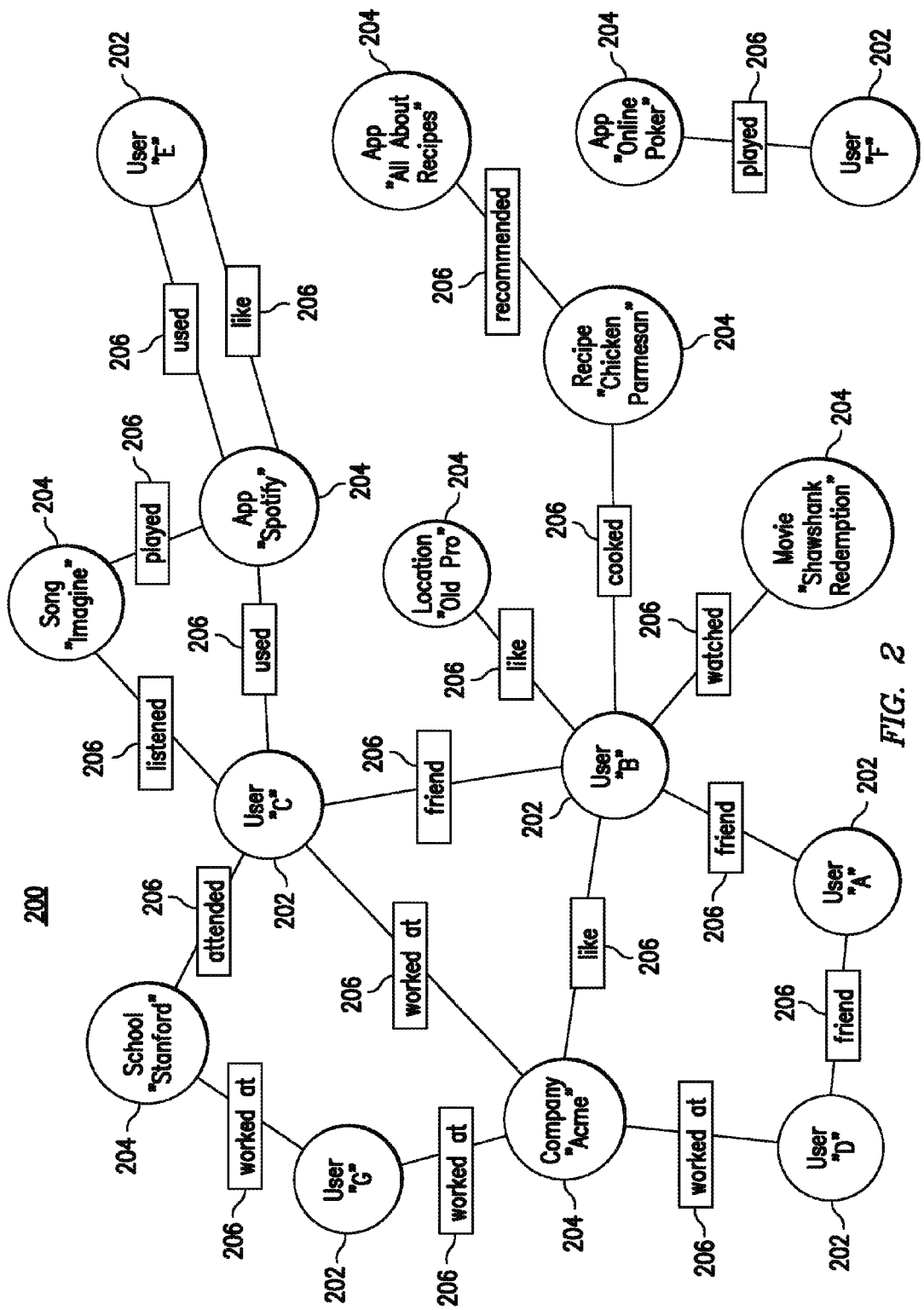
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
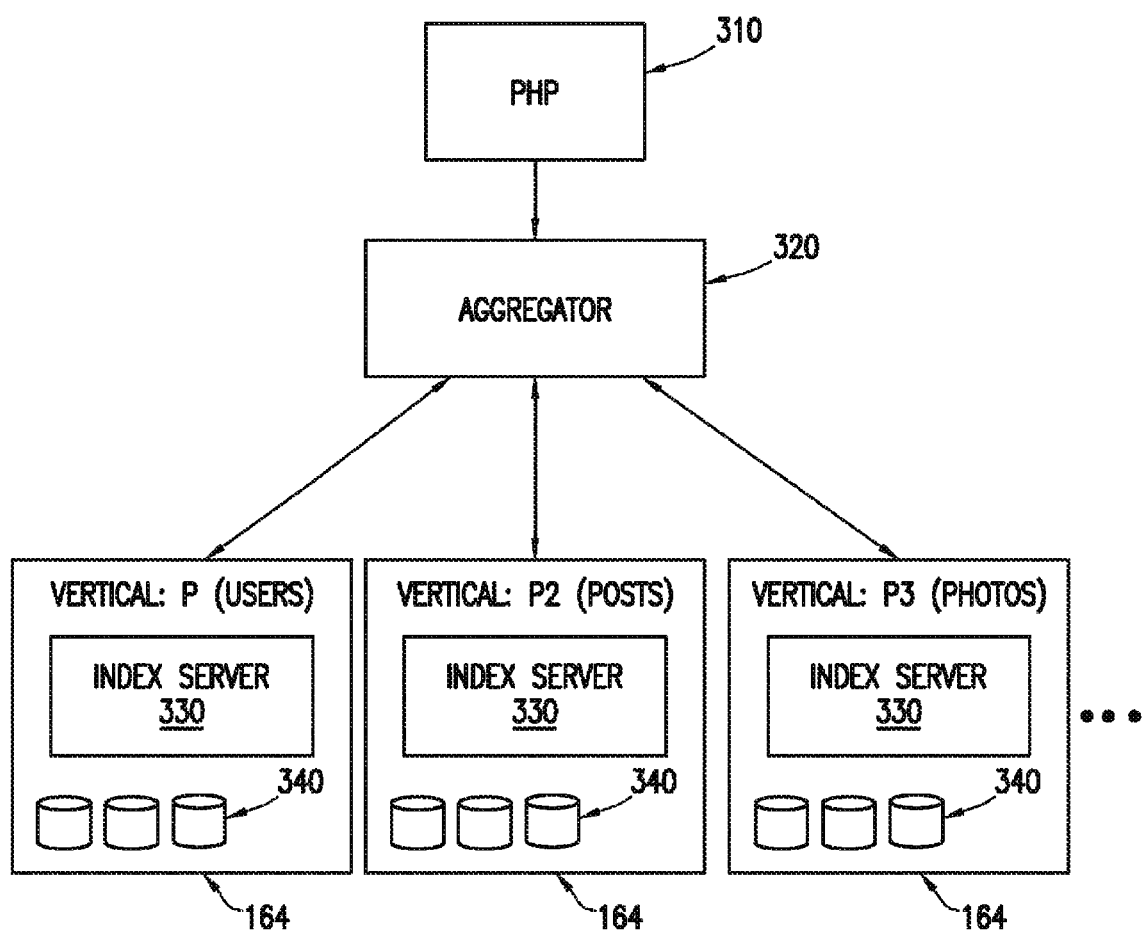
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned by based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a webpage, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/ contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170).

More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

Typeahead Processes

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element.

In particular embodiments, as a user types or otherwise enters text into a form used to add content or make declarations in various sections of the user's profile page, home page, or other page, the typeahead process may work in conjunction with one or more frontend (client-side) and/or backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text. Utilizing the social-graph information in a social-graph database or information extracted and indexed from the social-graph database, including information associated with nodes and edges, the typeahead processes, in conjunction with the information from the social-graph database, as well as potentially in conjunction with various others processes, applications, or databases located within or executing within social-networking system 160, may be able to predict a user's intended declaration with a high degree of precision. However, social-networking system 160 can also provides user's with the freedom to enter essentially any declaration they wish, enabling users to express themselves freely.

In particular embodiments, as a user enters text characters into a form box or other field, the typeahead processes may attempt to identify existing social-graph elements (e.g., user nodes 202, concept nodes 204, or edges 206) that match the string of characters entered in the user's declaration as the user is entering the characters. In particular embodiments, as the user enters characters into a form box, the typeahead process may read the string of entered textual characters. As each keystroke is made, the frontend-typeahead process may send the entered character string as a request (or call) to the backend-typeahead process executing within social-networking system 160. In particular embodiments, the typeahead processes may communicate via AJAX (Asynchronous JavaScript and XML) or other suitable techniques, and particularly, asynchronous techniques. In particular embodiments, the request may be, or comprise, an XMLHTTPRequest (XHR) enabling quick and dynamic sending and fetching of results. In particular embodiments, the typeahead process may also send before, after, or with the request a section identifier (section ID) that identifies the particular section of the particular page in which the user is making the declaration. In particular embodiments, a user ID parameter may also be sent, but this may be unnecessary in some embodiments, as the user may already be "known" based on the user having logged into (or otherwise been authenticated by) social-networking system 160.

In particular embodiments, the typeahead process may use one or more matching algorithms to attempt to identify matching social-graph elements. In particular embodiments, when a match or matches are found, the typeahead process may send a response (which may utilize AJAX or other suitable techniques) to the user's client system 130 that may include, for example, the names (name strings) or descriptions of the matching social-graph elements as well as, potentially, other metadata associated with the matching social-graph elements. As an example and not by way of limitation, if a user entering the characters "pok" into a query field, the typeahead process may display a drop-down menu that displays names of matching existing profile pages and respective user nodes 202 or concept nodes 204, such as a profile page named or devoted to "poker" or "pokemon", which the user can then click on or otherwise select thereby confirming the desire to declare the matched user or concept name corresponding to the selected node. As another example and not by way of limitation, upon clicking "poker," the typeahead process may auto-populate, or causes the web browser 132 to auto-populate, the query field with the declaration "poker". In particular embodiments, the typeahead process may simply auto-populate the field with the name or other identifier of the top-ranked match rather than display a drop-down menu. The user may then confirm the auto-populated declaration simply by keying "enter" on his or her keyboard or by clicking on the auto-populated declaration.

More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Variable Indexing with Typeahead Search Queries

Figure 4:
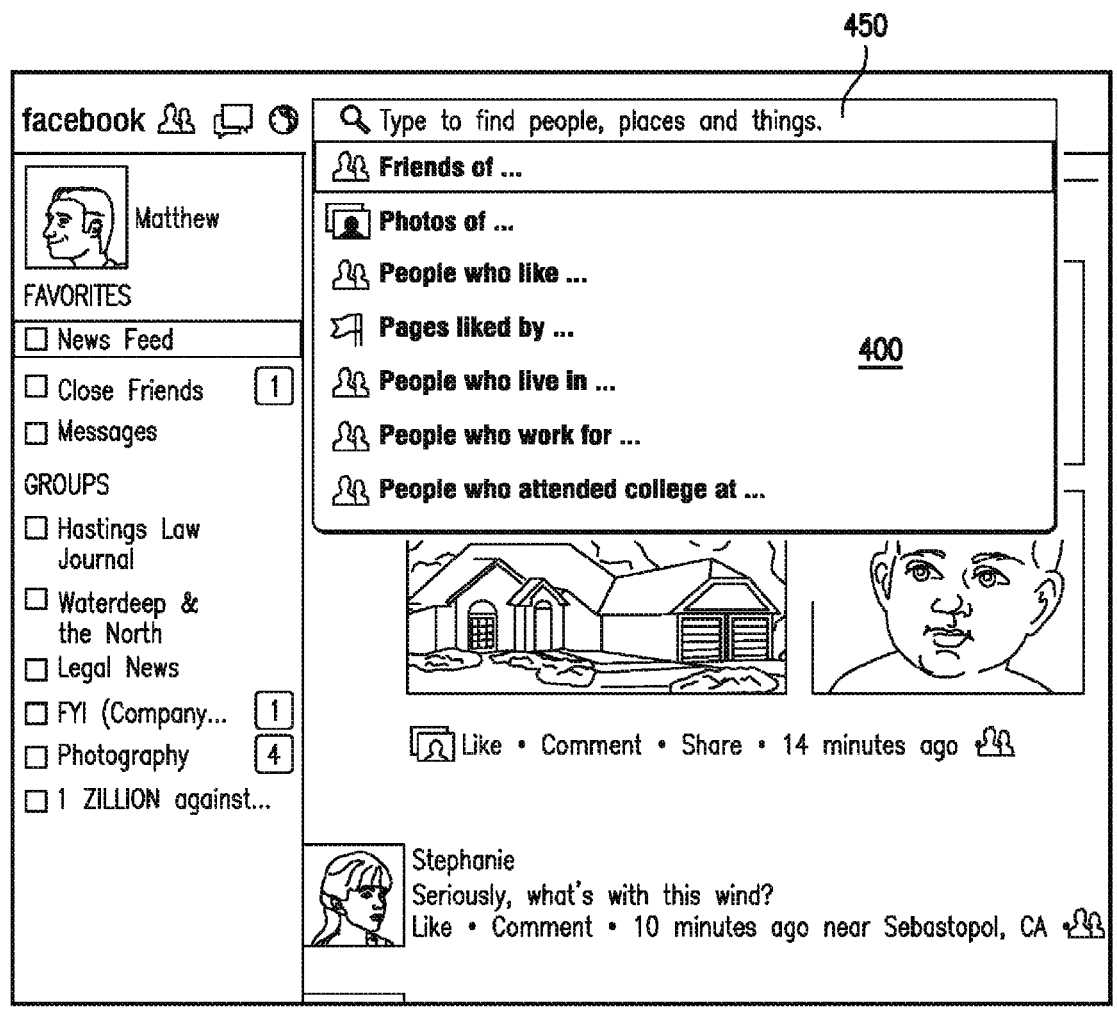
FIG. 4 illustrates an example webpage of an online social network.

FIG. 4 illustrates an example webpage of an online social network. In particular embodiments, a user may submit a query to the social-network system 160 by inputting text into query field 450. A user of an online social network may search for particular content objects (hereinafter "objects") or content-object-types (hereinafter "object-types") associated with the online social network (e.g., users, concepts, webpages, external content or resources) by providing a short phrase describing the object or object-type, often referred to as a "search query," to a search engine. The query may be a text query and may comprise one or more character strings (which may include one or more n-grams). In general, a user may input any character string comprising one or more characters into query field 450 to search for objects on social-networking system 160 that substantially matches the character string. Social-networking system 160 may then search one or more verticals 164 to identify objects matching the query. The search engine may conduct a search based on the query using various search algorithms and generate search results that identify objects (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified objects may include, for example, social-graph elements (i.e., user nodes 202, concept nodes 204, edges 206), profile pages, external webpages, or any combination thereof. Social-networking system 160 may then generate a search-results webpage with search results corresponding to the identified objects and send the search-results webpage to the user. In particular embodiments, the search engine may limit its search to objects associated with the online social network. However, in particular embodiments, the search engine may also search for objects associated with other sources, such as third-party system 170, the internet or World Wide Web, or other suitable sources. Although this disclosure describes querying social-networking system 160 in a particular manner, this disclosure contemplates querying social-networking system 160 in any suitable manner.

In particular embodiments, the typeahead processes described herein may be applied to search queries entered by a user. As an example and not by way of limitation, as a user enters text characters into a query filed 450, a typeahead process may attempt to identify one or more user nodes 202, concept nodes 204, or edges 206 that match the string of characters entered into the query filed 450 as the user is entering the characters. As the typeahead process receives requests or calls including a string or n-gram from the text query, the typeahead process may perform or causes to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu 400 that displays references to the matching profile pages (e.g., a name or photo associated with the page) of the respective user nodes 202 or concept nodes 204, and displays names of matching edges 206 that may connect to the matching user nodes 202 or concept nodes 204, which the user can then click on or otherwise select, thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu 400. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/732,101, filed 31 Dec. 2012, each of which is incorporated by reference.

Figure 5A:
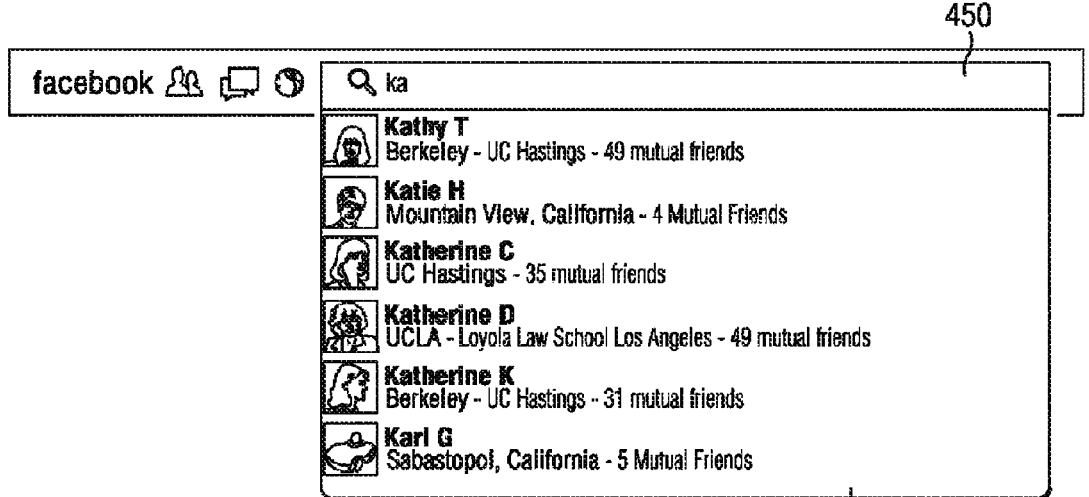
FIGS. 5A-5B illustrate example queries of the social network.
Figure 5B:
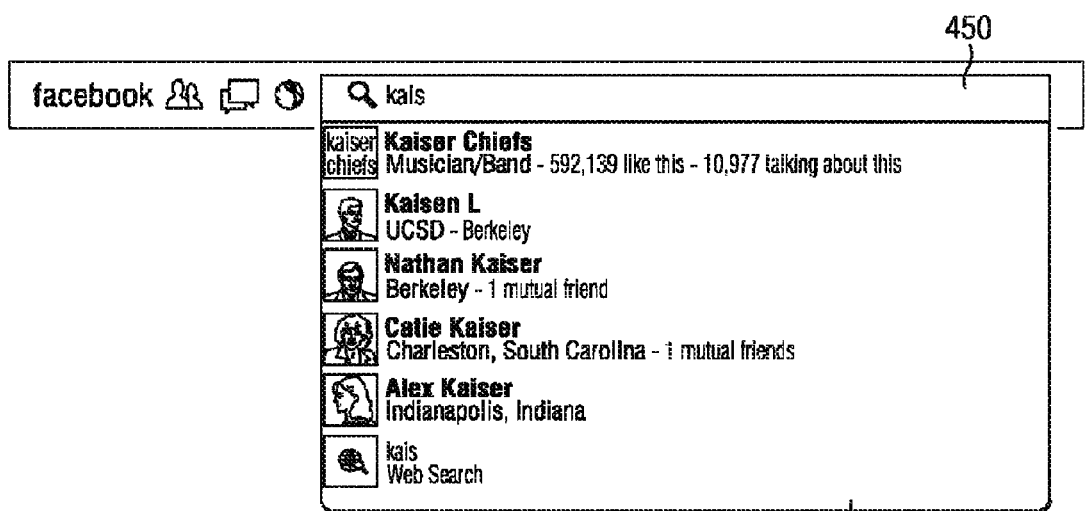

FIGS. 5A-5B illustrate example queries of the online social network. In particular embodiments, in response to a search query input received from a first user (i.e., the querying user), social-networking system 160 may accessing one or more verticals 164 to search for objects that match the search query input. The search query input may comprise a character string of one or more characters inputted by the querying user, for example, into a query field 450. The number of verticals 164 accessed in response to the search query input may vary based on the length of the character string (i.e., the search query length). For a very short character strings (e.g., a few characters), the character string may match a large number of objects. Consequently, processing a very short character string may be an intensive process. In order to improve the efficiency of the query process, only a limited number of verticals 164 (or even a subset of particular verticals 164) may be searched for matches to the short character strings. However, as the querying user inputs additional characters, additional verticals 164 may be searched. As the character string of the search query input increases in length, fewer objects will match the character string, and thus it may become more efficient to search a larger number of verticals 164 for matches to the longer character string. As the character string gets longer and the query gets more complex, more verticals 164 may be searched. As an example and not by way of limitation, if only two characters have been entered, as illustrated in FIG. 5A, only the users vertical 164 may be searched to identify users that match the characters entered. As more characters are added to the character string, additional verticals 164 (e.g., photos verticals 164, posts verticals 164, pages verticals 164, etc.) may be searched. As an example and not by way of limitation, once the querying user inputs four characters, as illustrated in FIG. 5B, the pages vertical 164 may also be searched to identified concepts that match the characters entered. Based on the identified objects, social-networking system 160 may then send references to one or more of the identified objects to the user for display, for example, in a drop-down menu 400 associated with the query field 450. In conjunction with the typeahead processed described previously, the references may be displayed to the user as the user inputs characters into the query field 450 as typeahead suggestions (via, for example, a client-side typeahead process). The querying user may then select among the typeahead suggestions to indicate that the object referenced in the suggestion should be retrieved by social-networking system 160. In other words, as the querying user enters more characters into the query field 450, the diversity of results displayed as typeahead suggestions in the drop-down menu 400 will increase as additional verticals 164 are searched. FIGS. 5A-5B illustrate various example search query inputs in query field 450 and various references to identified objects matching the search query input generated in response in drop-down menus 400 (although other suitable graphical user interfaces are possible). By accessing a variable number of verticals as described herein, the efficiency of the query process may be improved by limiting the number of verticals that are search in response to relatively short search queries that may match a large number of objects, and by expanding the number and type of verticals searches as the query becomes more refined. Although this disclosure describes and FIGS. 5A-5B illustrate searching verticals 164 in a particular manner, this disclosure contemplates searching verticals 164 in any suitable manner.

In particular embodiments, social-networking system 160 may receive from a querying/first user (corresponding to a first user node 202) a search query input. The search query input may be received in any suitable manner, such as, for example, by having the user input the character string into a query field 450 on a webpage of the online social network. The search query input may comprise a character string having a first number of characters. As an example and not by way of limitation, a user may want to search for a user named "Catie Kaiser", who is a $2^{nd}$-degree connection of the querying user. The querying user may begin by entering characters from the user's surname, "ka", as illustrated in FIG. 5A. In response, social-networking system 160 may search a users vertical 164 to identify one or more user nodes 202 (corresponding to user-profile pages) that match the character string "ka". However, for a character string of only two characters, social-networking system 160 may only search among users that are $1^{st}$-degree connections of the querying user, and thus the desired $2^{nd}$-degree connection "Catie Kaiser" may not be identified by entering only two characters. This may effectively force the querying user to input additional characters and refine the query in order to expand the scope of the search query. Thus, the querying user may enter additional character so that the search query input comprises a character string "kais", as illustrated in FIG. 5B. As the querying user enters each character into query field 450, social-networking system 160 may provide various typeahead suggestions that reference social-graph entities identified as matching the character string, as illustrated in drop-down menus 400. For the longer character string "kais", social-networking system 160 may expand its search to include $2^{nd}$-degree connections and pages, and thus the user "Catie Kaiser" may be identified as a matching object. FIG. 5B illustrates a drop-down menu 400 where a reference to the user "Catie Kaiser" is displayed in response to the query "kais". Although this disclosure describes receiving particular queries in a particular manner, this disclosure contemplates receiving any suitable queries in any suitable manner.

In particular embodiments, social-networking system 160 may parse the search query received from the first user (i.e., the querying user) to identify one or more n-grams. In general, an n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. An n-gram of size one can be referred to as a "unigram," of size two can be referred to as a "bigram" or "digram," of size three can be referred to as a "trigram," and so on. Each n-gram may include one or more parts from the search query received from the querying user. In particular embodiments, each n-gram may comprise a character string (e.g., one or more characters of text) entered by the first user. As an example and not by way of limitation, social-networking system 160 may parse the search query "all about recipes" to identify the following n-grams: all; about; recipes; all about; about recipes; all about recipes. In particular embodiments, each n-gram may comprise a contiguous sequence of n items from the search query. Although this disclosure describes parsing particular queries in a particular manner, this disclosure contemplates parsing any suitable queries in any suitable manner. In connection with element detection and parsing search queries, particular embodiments may utilize one or more systems, components, elements, functions, methods, operations, or steps disclosed in U.S. patent application Ser. No. 13/556,072, filed 23 Jul. 2012, U.S. patent application Ser. No. 13/732,101, filed 31 Dec. 2012, each of which is incorporated by reference.

In particular embodiments, social-networking system 160 may access one or more verticals 164 in response to a search query received from a user. Each vertical 164 may store one or more objects associated with the online social network. The number of verticals 164 accessed in response to the search query may be based on the length of the search query. As the search query length (i.e., the number of characters in the character string comprising the search query input) increases, additional verticals 164 may be accessed. Each additional set of verticals 164 accessed may be of a different object-type, such that as more characters are added to the character string, more object-types may be searched. In particular embodiments, if the search query length is less than or equal to a threshold number, then social-networking system 160 may access one or more first verticals, but if the search query length is greater than the threshold number, then social-networking system 160 may access the first verticals and one or more second verticals. This threshold number may be any suitable number of characters, such as, for example, one, two, three, four, or five characters. The first verticals and the second verticals may store objects of the same object-type or of different object-types. As an example and not by way of limitation, if search query length is less than a threshold number, then social-networking system 160 may search the users verticals 164 to identify only $1^{st}$-degree friends of the querying user that substantially match the character string of the search query input. In other words, social-networking system 160 may identify one or more user nodes 202 within one degree of separation of the user node 202 of the querying user. But if the search query length is greater than the threshold number, then social-networking system 160 may search the users verticals 164 to identify $1^{st}$-degree or $2^{nd}$-degree friends of the querying user that substantially match the character string of the search query input. In other words, social-networking system may identify one or more user nodes 202 within two degrees-of-separation of the user node 202 of the querying user. In particular embodiments, if the search query length is greater than both a first threshold number and a second threshold number, then social-networking system 160 may access the first verticals, the second verticals, and one or more third verticals. The second threshold number must be at least one character greater in length than the first threshold number. In other words, there may be multiple threshold numbers delimiting access to particular verticals 164. As subsequent threshold are crossed, social-networking system 160 may access one or more additional verticals 164. Any suitable number of threshold numbers for search query length may be specified. As an example and not by way of limitation, social-networking system 160 may access a cache associated with a web browser or one or more verticals 164 of the social-networking system 160 in the following manner:

disclosure describes accessing particular verticals 164 in a particular manner, this disclosure contemplates accessing any suitable verticals 164 in any suitable manner.

In particular embodiments, social-networking system 160 may access a cache associated with a web browser 132 of a client system 130 associated with the querying user. The cache may store information about one or more cached objects associated with the online social network. If the search query length is less than a threshold number, then social-networking system 160 may access the cache to search for matching objects (via, for example, a client-side search process). Any suitable objects (or portions of objects) associated with the online social network may be cached on the client system 130 of the querying user. Cached object (or information about such objects) may include, for example, pages associated with nodes having a high social-graph affinity with respect to the querying user (e.g., user-profile pages of close friends or family), friends of the querying user, frequently accessed pages, recently accessed pages, other suitable objects, or any combination thereof. As an example and not by way of limitation, as described in the table above, when the search query length is less than or equal to 1 character, social-networking system 160 may access a cache associated with a web browser 132 of the querying user to identify objects that substantially match the character string of the search query input. In this example, the cache may only store information associated with close friends and family of the querying user. However, as the search query length increases beyond this threshold, social-networking system 160 may search one or more verticals 164 instead of (or possibly in addition to) the cache. In particular embodiments, social-networking system 160 may search the cache to identify one or more cached objects that substantially match the character string of the search query input. Cached objects may be search and identified analogously to objects stored in verticals 164, as described previously. In particular embodiments, social-networking system 160 may send to the querying user one or more references to one or more of the identified cached objects, respectively. Where the identified object is stored in the cache of the client system 130 of the querying user, social-networking system 160 may simply instruct the web browser 132 to retrieve the cached object from the cache. Alterna-

| Threshold Search Query Length | Search Action | Number to Score |
|---|---|---|
| 0-1 characters | Search cache for highest scoring cached objects | All cached objects |
| 2 characters | Search users vertical 164 for matches among $1^{st}$-degree connections | 100 |
| 3 characters | Search users vertical 164 for matches among $1^{st}$-degree connections and $2^{nd}$-degrees connections of the 10 highest scoring $1^{st}$-degree connections | 150 |
| 4-5 characters | Search users vertical 164 for matches among $1^{st}$-degree and $2^{nd}$-degree connections. Search pages vertical 164. | 200 |
| 6-7 characters | Search users vertical 164 for matches among $1^{st}$-degree and $2^{nd}$-degree connections, or matches among users in same employer or education network. Search pages vertical 164. Search locations vertical 164. | 400 |
| 8 or more characters | Search entire social graph 200. | 500 |

In this example, a first, second, third, fourth, and fifth threshold number are specified at 1, 2, 3, 5, and 7 characters, respectively. As the search query length crosses each threshold, the scope of the search is expanded. In other words, as the search query length increase to 2, 3, 4, 6, and 8 characters, additional verticals 164 (or portions of verticals 164) are added to the scope of the search. Although this tively, the identified cached object may be retrieved from the social-networking system 160. Although this disclosure describes accessing particular cached objects in a particular manner, this disclosure contemplates accessing any suitable cached objects in any suitable manner.

In particular embodiments, social-networking system 160 may search each accessed verticals 164 to identify one or more objects that substantially match the character string of the search query input. Social-networking system 160 may identify matching objects in any suitable manner, such as, for example, by using one or more string matching algorithms to match the character string with a string of characters associated with each of one or more of the objects. As an example and not by way of limitation, in response to a search query input "kais", as illustrated in FIG. 5B, social-networking system 160 may access one or more users verticals 164 and one or more pages verticals 164 and search the accessed verticals to identify objects (e.g., user-profile pages or concept-profile pages) stored in those verticals. Social-networking system 160 may submit the following query command to each accessed vertical:

```
(AND (name: "kais")
     (OR friends_of: (friends_of: <me>))
     (OR pages: <>)).
```

Social-networking system 160 may access the index servers 330 of each vertical 164, causing index server 330 to return results that match the query command. As an example and not by way of limitation, social-networking system 160 may access index server 330 of a users vertical 164, causing index server 330 to identify users <Kaisen L>, <Nathen Kaiser>, <Catie Kaiser>, and <Alex Kaiser> (each represented by an user identifier). That is, users <Kaisen L>, <Nathen Kaiser>, <Catie Kaiser>, and <Alex Kaiser> may have a name matching "kais." Furthermore, each of these identified users matches the query constraint (friends_of: (friends_of: <me>)), which request objects corresponding to user that are friend-of-friends of the querying user. Social-networking system 160 may also access index server 330 of a pages vertical 164, causing index server 330 to identify the page for the band <Kaiser Chiefs>. That is, the band <Kaiser Chiefs> has a name matching "kais." Furthermore, the identify page matches the query constraint (pages: < >), which request objects corresponding to pages. As more characters are added to the character string, the query command described above may be modified to include additional query constraints that request objects from additional verticals 164 (or additional portions of the same verticals 164). In particular embodiments, social-networking system 160 may aggregate the identified objects by performing an OR operation on the identified objects. Although this disclosure describes identifying particular objects in a particular manner, this disclosure contemplates identifying any suitable objects in any suitable manner. In particular embodiments, social-networking system 160 may generate a query command comprising a "weak and" (WAND) or "strong or" operator (SOR). More information on WAND and SOR operators may be found in U.S. patent application Ser. No. 13/560,901, filed 27 Jul. 2012, which is incorporated by reference.

In particular embodiments, when searching verticals 164 to identify matching objects, social-networking system 160 may only identify and score up to a threshold number of matching nodes in a particular vertical 164. This threshold number of matching objects may then be scored and ranked by the social-networking system 160. The threshold number may be chosen to enhance search quality or to optimize the processing of search results. As an example and not by way of limitation, social-networking system 160 may only identify the top N matching objects (i.e., the number to score) in a users vertical 164 in response to a query command requesting users. The top N objects may be determined by a static ranking (e.g., ranking based on the current social-graph affinity of the user with respect to the querying user) of the objects in a search index corresponding to the users vertical 164. In particular embodiments, the top N identified object may be re-ranked based on the search query itself. As an example and not by way of limitation, if the number to score is 500, the top 500 objects may be identified. These 500 objects may then be ranked based on one or more factors (e.g., match to the search query or other query constraints, social-graph affinity, search history, etc.), and the top M results may then be generated as typeahead suggestions for display to the querying user (for example, the top 6 results may be displayed in a drop-down menu 400, as illustrated in FIGS. 5A and 5B). In particular embodiments, the top results after one or more rounds of rankings may be sent to an aggregator 320 for a final round of ranking, where identified objects may be reordered, redundant results may be dropped, or any other type of results-processing may occur before presentation to the querying user. Although this disclosure describes identifying particular numbers of objects, this disclosure contemplates identifying any suitable numbers of objects. Furthermore, although this disclosure describes ranking objects in a particular manner, this disclosure contemplates ranking objects in any suitable manner.

In particular embodiments, social-networking system 160 may generate one or more references to the identified objects. These references may be generated as typeahead suggestions to be displayed to the user in response to the search query input from the querying user. The typeahead suggestions (e.g., the reference to the identified nodes or their corresponding profile pages) may be scored (or ranked) and presented to the user according to their relative degrees of relevance to the search query input, as determined by the particular search algorithm used to generate the typeahead suggestions. The typeahead suggestions may also be scored and presented to the user according to their relative degree of relevance to the user. In particular embodiments, the typeahead suggestions may scored or ranked by a particular scoring/ranking algorithm implemented by the search engine. As an example and not by way of limitation, typeahead suggestions that are more relevant to the search query or to the user may be scored higher than the resources that are less relevant. The way relevance is determined may be modified based on the search intent identified by social-networking system 160. In particular embodiments, social-networking system 160 may rank the one or more typeahead suggestions. Typeahead suggestions may be ranked, for example, based on the score determined for the typeahead suggestion. The most relevant result (e.g., highest/best scoring) may be ranked highest, with the remaining results having lower ranks commensurate with their score/relevance, such that the least relevant result is ranked lowest. Although this disclosure describes generating particular reference to identified objects in a particular manner, this disclosure contemplates generating any suitable references to identified object in any suitable manner.

In particular embodiments, social-networking system 160 may send to the querying user one or more references to one or more of the identified objects, respectively. As the user enters the search query input as a character string into a query field 450, the typeahead processes described previously may automatically send the references to the identified objects as typeahead suggestions. The typeahead suggestions may be sent to the user, for example, in the form of a list of links displayed in a drop-down menu 400 (which may be associated with the query field 450), each link being associated with a different webpage comprising the identified objects. In particular embodiments, each link in the typeahead suggestions may comprise a Uniform Resource Locator (URL) that specifies where the corresponding webpage comprising the referenced content object is located and the mechanism for retrieving it. Social-networking system 160 may then send the typeahead suggestions to the web browser 132 on the user's client system 130. The user may then click on the URL links or otherwise select the object from the drop-down menu 400 to access the object from social-networking system 160 or from an external system (such as, for example, third-party system 170), as appropriate. In particular embodiments, each typeahead suggestion may include link to a profile page and a description or summary of the profile page (or the node corresponding to that page). When generating the typeahead suggestions, social-networking system 160 may generate one or more snippets for each typeahead suggestion, where the snippets are contextual information about the target of the typeahead suggestion (i.e., contextual information about the social-graph entity, profile page, or other objects corresponding to the particular typeahead suggestion). In particular embodiments, social-networking system 160 may only send typeahead suggestions having a score/rank over a particular threshold score/rank. As an example and not by way of limitation, social-networking system 160 may only send the top ten suggestions back to the querying user in response to a particular search query input. Although this disclosure describes sending particular references to identified objects in a particular manner, this disclosure contemplates sending any suitable references to identified objects in any suitable manner.

Figure 6:
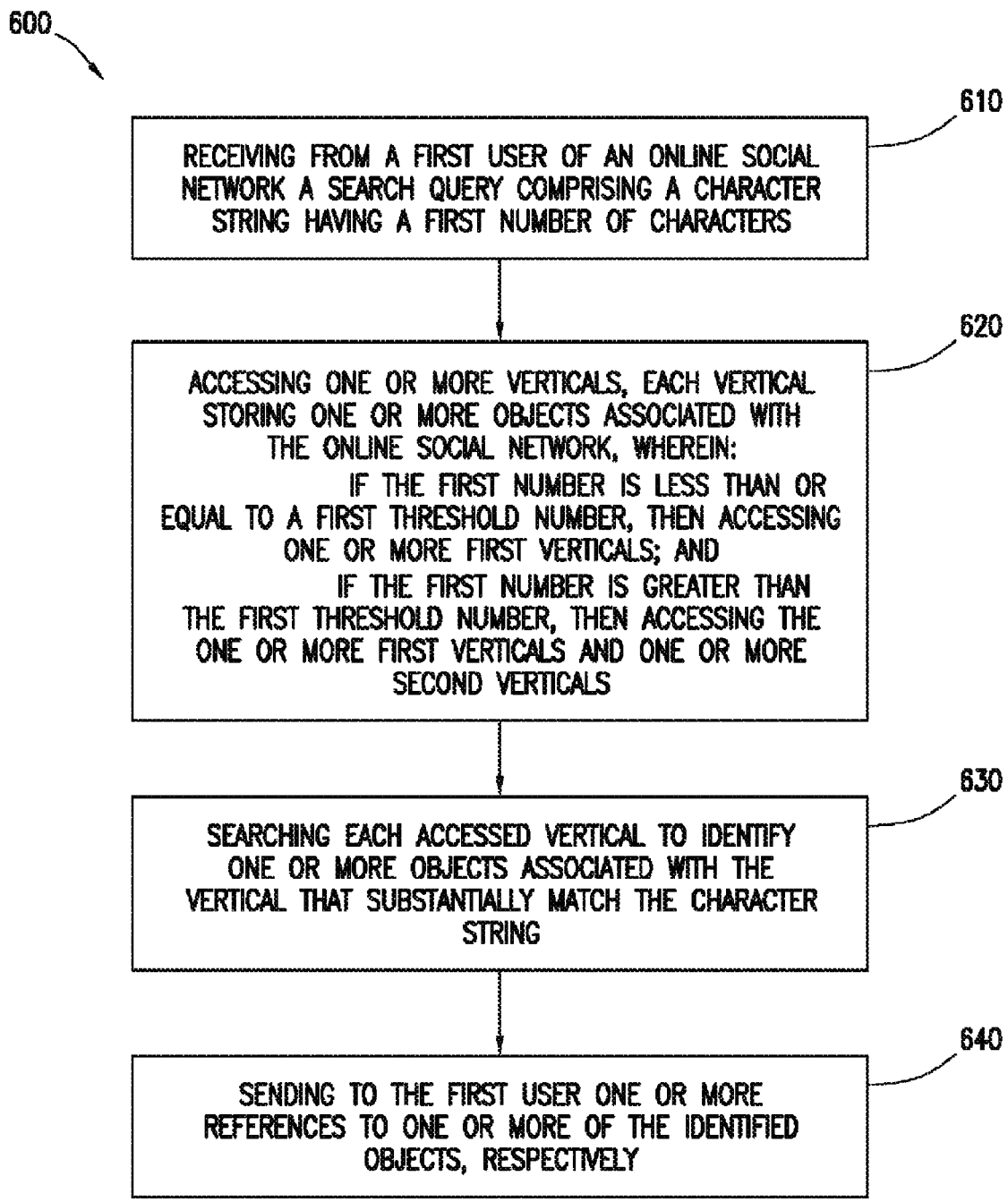
FIG. 6 illustrates an example method for searching verticals in response to a query.

FIG. 6 illustrates an example method 600 for searching verticals in response to a query. The method may begin at step 610, where social-networking system 160 may receive from a first user of an online social network a search query comprising a character string having a first number of characters. At step 620, social-networking system 160 may access one or more verticals 164. Each vertical 164 may store one or more objects associated with the online social network. If the first number is less than or equal to a first threshold number, then social-networking system 160 may access one or more first verticals 164. However, if the first number is greater than the first threshold number, then social-networking system 160 may access the one or more first verticals 164 and one or more second verticals 164. At step 630, social-networking system 160 may search each accessed vertical 164 to identify one or more objects associated with the vertical 164 that substantially match the character string. At step 640, social-networking system 160 may send to the first user one or more references to one or more of the identified objects, respectively. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
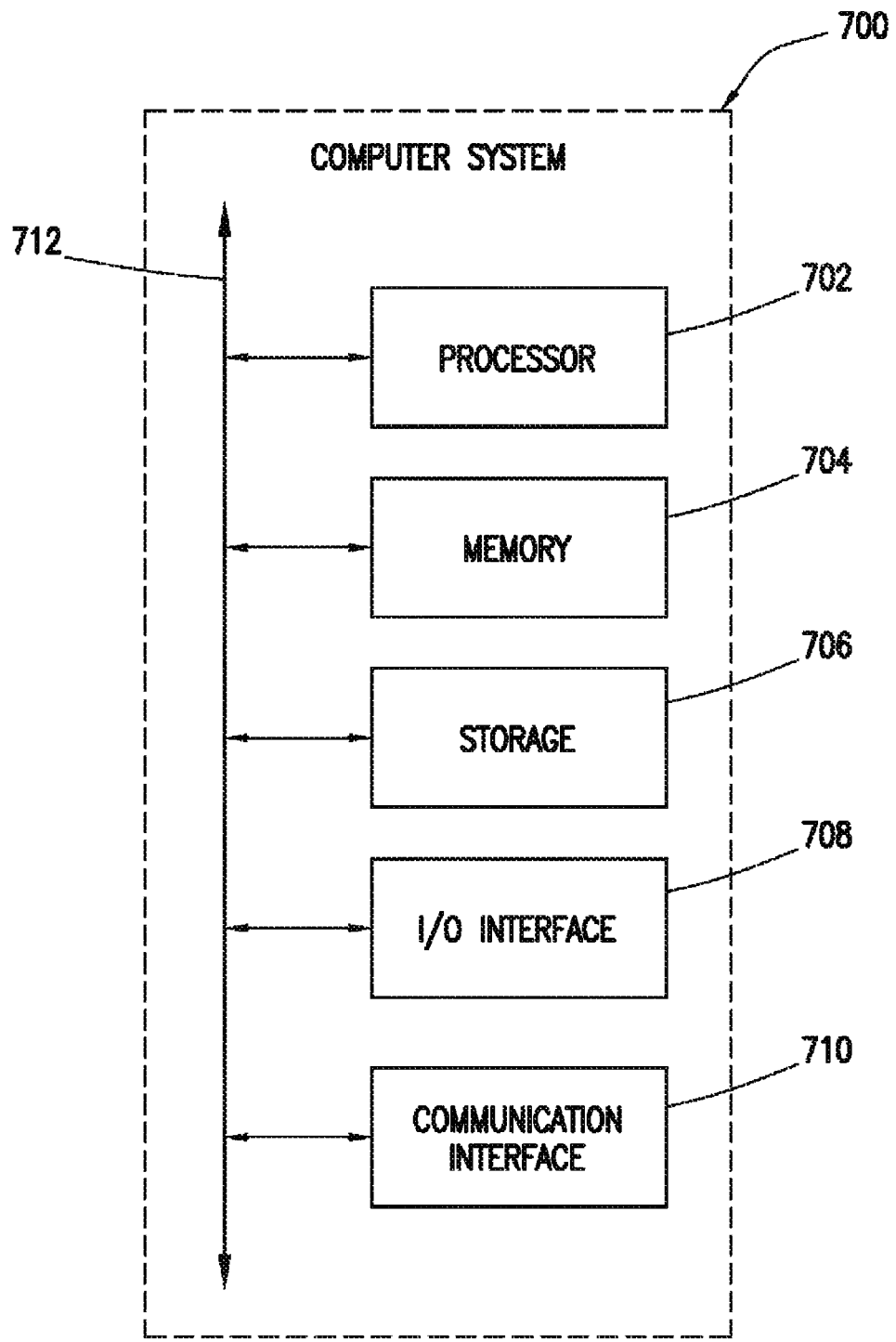
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:

receiving, from a client system of a first user of an online social network, a search query input comprising a character string having a first number of characters;

accessing one or more verticals, each vertical being external to the client system and storing one or more objects of a particular object-type of a plurality of object types associated with the online social network, wherein:
  if the first number is less than or equal to a first threshold number, then accessing one or more first verticals, wherein each first vertical stores objects of a first object-type; and
  if the first number is greater than the first threshold number, then accessing the one or more first verticals and one or more second verticals, wherein each second vertical stores objects of a second object-type different than the first object-type;

searching each accessed vertical to identify one or more objects associated with the vertical that substantially match the character string; and sending, to the client system of the first user, one or more references to one or more of the identified objects, respectively.

2. The method of claim 1, wherein accessing one or more verticals further comprises:
if the first number is greater than a second threshold number, then accessing the one or more first verticals, the one or more second verticals, and one or more third verticals, wherein each third vertical stores objects of a third object-type different than the first and second object-types, and wherein the second threshold number is greater than the first threshold number.

3. The method of claim 2, wherein:
the first threshold number is one, two, three, four, or five characters; and
the second threshold number is at least one character greater than the first threshold number.

4. The method of claim 1, wherein the first object-type and
the second object-type are each selected from a group consisting of: a user, a photo, a post, a webpage, an application, a location, or a user group.

5. The method of claim 1, wherein the first threshold number is one, two, three, four, or five characters.

6. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes that each correspond to a concept or a second user associated with the online social network.

7. The method of claim 6, wherein each node of the plurality of nodes is associated with a particular object.

8. The method of claim 6, wherein each first vertical is a users vertical storing one or more user-profile pages of the online social network, each user-profile page corresponding to a node of the plurality of nodes.

9. The method of claim 8, wherein each second vertical is a selected from a group consisting of: a photos vertical; a posts vertical; a pages vertical; a locations vertical; an applications vertical; or a user-groups vertical.

10. The method of claim 6, wherein searching the accessed verticals to identify one or more objects associated with the vertical that substantially match the character string comprises:
if the first number is less than or equal to a first threshold number, then searching the users verticals to identify one or more second nodes within one degree of separation of the first node; and if the first number is greater than the first threshold number, then searching the users verticals to identify one or more second nodes within two degrees of separation of the first node.

11. The method of claim 1, wherein the character string is a user-generated character string received from a client system associated with the first user, and wherein the user-generated character string is entered by the first user in a query field and rendered at the client device as each character of the character string is entered by the user.

12. The method of claim 11, further comprising:
auto-populating, at the client system, the query field with the references to the identified objects.

13. The method of claim 1, wherein searching the accessed verticals to identify one or more objects associated with the vertical that substantially match the character string comprises using one or more string matching algorithms to attempt to match the character string with a string of characters associated with each of one or more of the objects.

14. The method of claim 1, further comprising:
receiving a selection of one of the references from the first user; and
sending the object corresponding to the reference to the first user.

15. One or more computer-readable non-transitory storage media embodying software that is operable when executed to:
receive, from a client system of a first user of an online social network, a search query input comprising a character string having a first number of characters;
access one or more verticals, each vertical being external to the client system and storing one or more objects of a particular object-type of a plurality of object types associated with the online social network, wherein:
if the first number is less than or equal to a first threshold number, then access one or more first verticals, wherein each first vertical stores objects of a first object-type; and
if the first number is greater than the first threshold number, then access the one or more first verticals and one or more second verticals, wherein each second vertical stores objects of a second object-type different than the first object-type;
search each accessed vertical to identify one or more objects associated with the vertical that substantially match the character string; and
send, to the client system of the first user, one or more references to one or more of the identified objects, respectively.

16. A system comprising: one or more processors; and a memory coupled to the processors comprising instructions executable by the processors, the processors operable when executing the instructions to:
receive, from a client system of a first user of an online social network a search query input comprising a character string having a first number of characters;
access one or more verticals, each vertical being external to the client system and storing one or more objects of a particular object-type of a plurality of object types associated with the online social network, wherein:
if the first number is less than or equal to a first threshold number, then access one or more first verticals, wherein each first vertical stores objects of a first object-type; and
if the first number is greater than the first threshold number, then access the one or more first verticals and one or more second verticals, wherein each second vertical stores objects of a second object-type different than the first object-type;
search each accessed vertical to identify one or more objects associated with the vertical that substantially match the character string; and
send, to the client system of the first user one or more references to one or more of the identified objects, respectively.

17. The method of claim 1, wherein:
each first vertical is a users vertical storing one or more user-profile pages of the online social network, each user-profile page corresponding to a node of the plurality of nodes, and
each second vertical is a selected from a group consisting of: a photos vertical; a posts vertical; a pages vertical; a locations vertical; an applications vertical; or a user-groups vertical.

18. The method of claim 1, wherein accessing one or more first verticals comprises:
accessing a users vertical comprising one or more user-profile pages of the online social network, each user-profile page corresponding to a node of the plurality of nodes; and
searching the users vertical for one or more user-profile pages, wherein each user-profile page corresponds to a node that is separated by an edge from a node corresponding to the first user.

* * * * *